March 11, 1969  TEIJI UCHIDA  3,432,223
MODULATOR FOR A LIGHT BEAM
Filed April 1, 1964
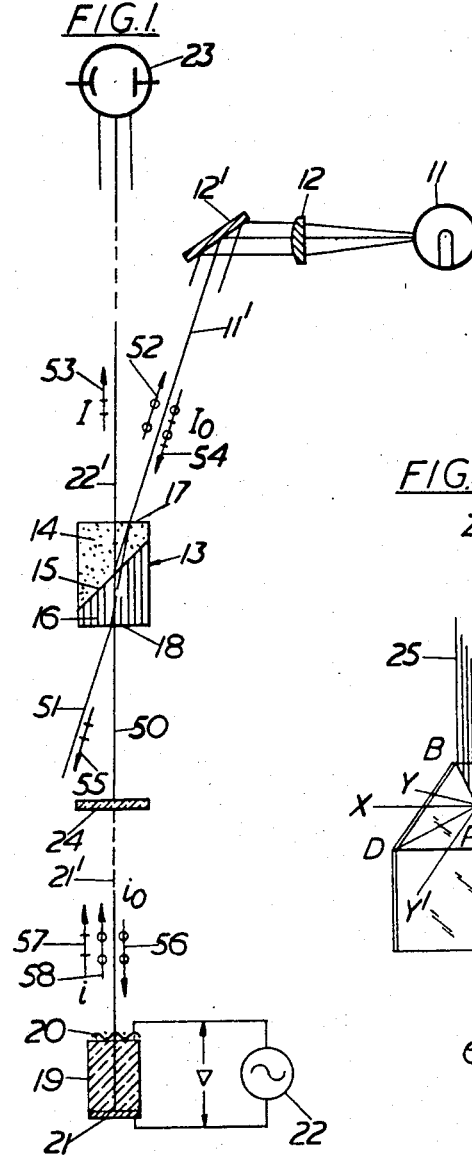
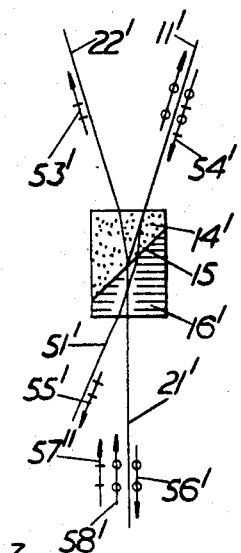
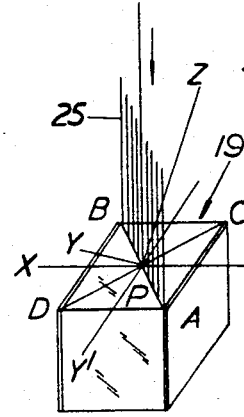
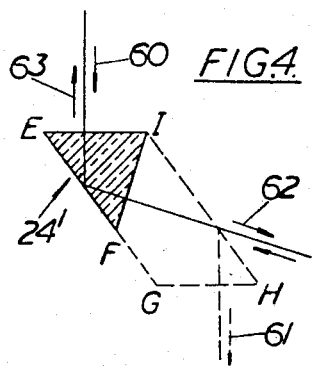
Inventor
T. UCHIDA
By R.D. Morris
Attorney

United States Patent Office 3,432,223
Patented Mar. 11, 1969

3,432,223
MODULATOR FOR A LIGHT BEAM
Teiji Uchida, Minato-ku, Tokyo, Japan, assignor to Nippon Electric Company, Limited, Tokyo, Japan, a corporation of Japan
Filed Apr. 1, 1964, Ser. No. 356,381
Claims priority, application Japan, Apr. 10, 1963, 38/18,890
U.S. Cl. 350—150
Int. Cl. G02f 1/26, 1/28, 1/24
5 Claims

ABSTRACT OF THE DISCLOSURE

An optical modulator includes a crystal of large electro-optical effect having two parallel surfaces substantially perpendicular to an optical axis, a remote surface including a reflective film acting on light passing through the crystal. Means are included for applying a modulating signal across the crystal to rotate the plane of polarization of an incident light beam. A birefringence prism is disposed between the light source and crystal for splitting the source beam into two rays directing one of the beams to the crystal piece and directing the modulated reflected component of that beam along an optical path other than that from the source.

---

This invention relates to an improved, simple modulator for a light beam wherein use is made of the electro-optical effect of a crystal.

An object of the invention is to provide a modulator of simple construction for a light beam.

Another object of the invention is to provide a modulator for a light beam whose sensitivity is twice as large as that of conventional modulators.

According to the invention, the modulator for a light beam includes a birefringence element, such as a Rochon's prism, for allowing transmission therethrough of a first linearly polarized light (which is at least one of two linearly polarized light beams separated from each other and which originated from an incident light) incident thereon in a given direction. Said element also allows transmission therethrough of a second linearly polarized light which is incident thereon in a reverse direction along the path of said first linearly polarized light (after having passed therethrough) and which has its electric intensity along a line perpendicular to the electric intensity of said first linearly polarized light. The last-mentioned transmission is controlled such that said second linearly polarized light may be taken out of said birefringence element in a direction different from said given direction. The modulator also includes a crystal member, such as a Z-cut KDP (potassium dihydrogen phosphate $KH_2PO_4$) crystal, having a relatively larger electro-optical effect than a normal crystal, so that when said crystal member is supplied with a voltage in a first direction determined relative to the crystallographic axes thereof, the first and the second linearly polarized components of a generally elliptically polarized light travelling therethrough in either sense (along a second direction determined relative to said first direction) the polarized light will travel therethrough with different speeds which are both determined in accordance with said voltage. The electric intensities of said first and said second linearly polarized components lie along the major and the minor axes of the ellipse of said generally elliptically polarized light, respectively. The modulator also includes: means for applying a modulating voltage to said crystal member; a reflecting surface on said crystal for reflecting the generally elliptically polarized light which has passed through said crystal member along said second direction; said birefringence element, and said crystal member. Said reflecting surface is arranged so that said first linearly polarized light (which is a sort of generally elliptically polarized light) can travel through said crystal member as a first generally elliptically polarized light and thereafter be reflected at said reflecting surface back through said crystal member as a second elliptically polarized light which passed through said crystal member in the reversed sense with respect to said first generally elliptically polarized light. A linearly polarized component of said second elliptically polarized light having an electric intensity of said first linearly polarized light (and after having passed through said crystal member), is made to fall incident on said birefringence element as said second linearly polarized light.

In order to facilitate understanding of the invention, a general description will first be made of the components of a modulator of this invention which are different from those in a conventional light modulator in their construction and their mode of operation. The Rochon's prism which serves as the birefringence element, operates in the usual manner so that natural light is incident perpendicularly to an outer refracting surface of a first prism thereof (whose optical axis is perpendicular both to the outer surface itself and to the edge of the prism) bifurcates the light at the inner refracting surface (or the junction surface) into the ordinary ray and the extraordinary ray in the second prism. Thereafter the ordinary ray propagates rectilinearly through the second prism and goes out thereof at the outer refracting surface thereof while the extraordinary ray propagates and is refracted at the inner refracting surface and then at the last-mentioned outer refracting surface and goes obliquely out of the latter surface.

Thus, it is possible at a sufficient distance from the Rochon's prism, to entirely separate a linearly polarized light which has passed perpendicularly through the outer refracting surface and has its electric intensity along a line perpendicular to the edge of the prism, from another linearly polarized light which has passed obliquely through the outer refracting surface and has its electric intensity along a line parallel to the edge of the prism. If a beam of natural light falls reversely only on the outer surface of the second prism and perpendicularly thereto, the ordinary ray in the second prism propagates (without being refracted at the junction surface), into the first prism to go out thereof perpendicularly to the outer refracting surface thereof, while the extraordinary ray within the second prism propagates and is refracted at the inner refracting surface and subsequently at the outer refracting surface of the first prism to be obliquely taken out of the last-mentioned refracting surface. Therefore, it is also possible to completely separate (at a sufficient distance from the Rochon's prism) a linearly polarized light which is passed perpendicularly through the outer refracting surface (with its electric intensity lying along a line perpendicular to the edge of the prism) from another linearly polarized light which has obliquely passed through the outer refracting surface and has its electric intensity lying along a line parallel to the edge of the prism. Thus, the Rochon's prism can separate from a beam of light incident thereon (along a given direction) a first linearly polarized light (such as one whose electric intensity is perpendicular to the edge of the prism) from a second linearly polarized light propagating therethrough reversely along the path of the first linearly polarized light. The second linearly polarized light passes therethrough and is separated from the incident light by said prism. Incidentally, it will be understood that a pencil beam of natural light incident on either the first or the second prisms with a small angle of incidence takes substantially the same path as mentioned above.

In this invention, it is contemplated to let a Rochon's prism or the like serve (by causing a light beam to go and return therethrough) as both the polarizer and the analyzer. This may be achieved by a set of Nicol's prisms.

A description will now be made of the electro-optical effect of a uniaxial crystal belonging to the tetragonal system. With regard to the KDP crystal, it should be noted that application of the modulating voltage V between the principal surfaces of a Z-cut member (which is a piece of crystal cut off from the crystal at a pair of parallel planes lying perpendicularly to the optical axis or the Z-axis) to produce an electric field in the direction of the Z-axis also provides an induced optical X' and Y' axes along the directions making an angle of $-45°$ with the X and Y crystallographic axes of the tetragonal crystal, respectively, as may be determined by the etch figures and the like. As described in "Proceedings of the I.R.E.," vol. 50 (1962), pp. 452–456 (April), the refractive induces $n_X$, and $n_Y$, for the respective beams of linearly polarized light whose electric intensities are along the induced X' and Y' axes, respectively, are given by $$n_X' = n_0 + k \cdot E$$

and $$n_Y' = n_0 - k \cdot E \tag{1}$$

respectively, where $n_0$ is the refractive index when the modulating voltage V is zero, E is the Z-component of the intensity of the electric field produced by the modulating voltage V in the Z-cut member, and $k$ is a constant which is determined by the kind of the crystal (and which, although far smaller than unity, is fairly large when compared with other types of crystal).

It follows therefore that if a first linearly polarized light falls perpendicularly onto the first surface of the Z-cut member along the Z-axis, and if the electric intensity of said light is in the direction of the Y-axis, then the linearly polarized components (with their electric intensities lying along the induced X' and Y' axes) will travel with different speeds in accordance with Equations 1. Such components leave the Z-cut member (or the second surface) with a phase difference P which is given by $$P = 4kV/l \tag{2}$$

where $l$ is the wavelength of the incident light in air (and which depends neither on the thickness of the Z-cut member nor on the electric field produced by the modulating voltage V but is proportional to the modulating voltage V itself). Thus, the incident first (or input) linearly polarized light is converted into a second elliptically polarized light whose electric intensity lies along the X-axis. The intensity $i$ of the derived second linearly polarized light is given by $$i/i_0 = (1 - \cos P)/2$$
$$= [1 - \cos (\pi V/V_0)]/2 \tag{3}$$

where $i_0$ is the intensity of the incident first linearly polarized light and $V_0$ is that virtual voltage required to convert the whole incident first linearly polarized light into the second linearly polarized light.

In this invention, it is contemplated to double the ratio of the light intensities given by the Equation 3 by utilizing the fact that Equation 1 holds (when the sense of the modulating voltage V along the Z-axis is given) for light travelling along the Z-axis in both directions (as is the case with a quarter-wavelength plate) and also by utilizing the fact that the phase difference P given by Equation 2 is doubled when the light is reciprocated within the Z-cut member.

The above-mentioned and other features and objects of this invention and the means of attaining them will become more apparent and the invention itself will be best understood by reference to the following description of embodiments of the invention taken in conjunction with the accompanying drawings in which:

FIG. 1 schematically shows, partly in section, a modulator for a light beam according to the invention which includes a Rochon's prism;

FIG. 2 is a sectional view of a Wollaston's prism which may be used in the invention;

FIG. 3 is a perspective view of a crystal member of a cubic system crystal which may be used in the invention; and FIG. 4 is a sectional view of a prism which may be used in this invention which provides a phase difference of one-eighth wavelength.

Referring to FIG. 1, the light emitted at a light source 11 is shaped by a condenser system 12 into parallel rays of light, which are then deflected (if necessary) by a plane mirror 12, to fall as incident light 11' on a Rochon's prism 13. Light 11' contains ordinary and extraordinary rays as shown by the symbols on arrow 54 which shows the direction of light 11'. The extraordinary rays are indicated by circles on the arrows; the ordinary rays by hash marks on the arrows. Inasmuch as a Rochon's prism 13 serves nearly similarly for the incident light 11' falling onto either of its outer refracting surfaces (in the manner described above) it will be assumed in the following explanation that the orientation of the Rochon's prism 13 is as shown in FIG. 1. If the junction surface between the first and the second prism makes an angle of 45° with the outer refracting surfaces of the prism, then the angle of incidence of the incident light falling onto the first prism is about 9°.

More particularly, the Rochon's prism 13 is so disposed that the optical axis of a first calcite prism 14 thereof lies perpendicular to the path of light travelling therefrom to a KDP Z-cut member 19 (to be described hereinafter) and parallel to a junction surface 15 of the Rochon's prism. The optical axis of a second calcite prism 16 of prism 14 is made to lie along the above-mentioned path. Inasmuch as the refractive indices of the calcite are 1.6585 and 1.4864 for the ordinary and the extraordinary rays of the wavelength of the D-line, the path of the light in the embodiment of FIG. 1 will now be described. Assume the junction surface 15 of the Rochon's prism is disposed at the angle of 45°. (It should be noted that for clarity the angles shown in the path illustrated in FIGURE 1 are larger than the actual ones.) When the angle of incidence of the incident light 11' at a first refracting surface 17 which is in a perpendicular plane with respect to the optical axis of the first calcite prism 14) is about 9°, then that first linearly polarized light is refracted at the junction surface 15 to go perpendicularly out of the second refracting surface 18, along the path 50. Meanwhile, the second linearly polarized light in beam 11' is scarcely refracted at the junction surface 15 and obliquely leaves the second refracting surface 18 along path 51. These rays are the ordinary rays within the first calcite prism 14 and leave surface 18 along path 51 in the direction of the arrow 55. This second linearly polarized light leaving along path 51 is not utilized in this embodiment.

The first linearly polarized light which has passed perpendicularly through the refracting surface 18 and along path 50 is now projected perpendicularly onto a KDP Z-cut member 19. The Z-cut member 19 has on its surface facing the birefringence element a nearly transparent mesh electrode 20 of about 25 mesh which is formed with strips about 0.1 mm. wide. On the opposite surface of crystal 19, a reflecting surface 21 (which reflects light substantially completely) reflects the first linearly polarized light back towards the Rochon's prism 13 as light rays 21' travelling in a reverse direction with respect to arrow 56. Light 21' has two components, the ordinary rays shown by arrow 57 and the extraordinary rays shown by arrow 58. In this connection, it should be noted that the Z-cut member 19 is so oriented relative to the birefringence element that either of its X and Y axes may be parallel to the electric intensity of the first linearly polarized light, thereby to produce (when supplied with the modulating voltage V from a modulating source 22 connected to the electrodes 20 and 21), in the reflected light 21' a component of the second linearly polarized light whose intensity is modulated by the modulating voltage V in accordance with Equation 3. Incidentally, the beams of the first and the second linearly polarized light undergo substantially the same phase variation upon being reflected. Inasmuch as the electric intensity of the modulated second linearly polarized light is perpendicular to that of the first linearly polarized light, this second linearly polarized light becomes the ordinary ray both for the second and the first calcite prisms 16 and 14 of the Rochon's prism 13 and go therethrough as indicated by arrows 53 and 52 without being refracted, perpendicularly through either the junction 15 or the first refracting surface 17. When the modulating voltage V carries speech or other information, the embodiment serves by itself as an apparatus for communication with light and if provided with a light receiver 23 for measuring the intensity I of an output light 22' traveling as indicated by arrow 53 or the second linearly polarized light in the reflected light 21'. The embodiment may also serve as measuring equipment for determining the intensity I of the original incident light the characteristic constant $k$ of the KDP Z-cut member 19 with reference to the Equations 2 and 3. In the latter connection, it is to be noted that the relation between the intensity $I_0$ of the incident light 11' and $i_0$ actually incident onto the Z-cut member 19 is to be determined either by calculation or by preliminary experiment and that the intensity I of the output light 22' and that of $i$ of the second linearly polarized light coming out of the Z-cut member 19 may be considered substantially the same. The other component of $i$ in the light leaving the Z-cut member 19 shown by arrow 58 whose electric intensity lies in the direction of that of the first linearly polarized light travels through the Rochon's prism 13 along the same path as the incident light 11' as indicated by arrow 52 and does not find any use in the embodiment.

As will have become clear from the above, the invention provides twice as large modulation sensitivity as a conventional light modulator having a similar crystal member with the same modulating voltage, because the light is modulated twice in the Z-cut member 19. Also, the invention is simple in construction, because the Rochon's prism 13 acts as both the polarizer and the analyser (which may be two Nicol's prisms in a conventional light modulator).

The intensity I of the modulated output light 21' varies in a nonlinear relation (as shown by Equation 3) with respect to the modulating voltage V. In order to provide linearity to the modulation characteristic a one-eighth-wavelength plate 24 of mica or other similar means may be placed between the Rochon's prims 13 and the KDP Z-cut )member 19 in such a manner that the phase-advancing and the phase-retarding axes thereof are parallel to the induced X' and Y' axes of the Z-cut member 19. This optically biases the reciprocating light by a quarter wavelength in total and thus serves as a quarter-wavelength plate used in a conventional modulator for the linearly polarized light.

With the modulator for a light beam shown in FIG. 1, the same effect may be obtained by interchanging the light input system (including the light source 11, the condenser system 12, and the plane mirror 12' if such is used), and the light output system including the light receiver 23. This holds true even for the light modulators comprising other birefringence elements to be described hereinafter.

The light source 11 is preferably one which emits monochromatic or nearly monochromatic natural light. If the emitted light is linearly polarized, the electric intensity of the incident light must be disposed parallel to that of the first linearly polarized light shown in FIG. 1. The optical system consisting of the condenser system 12 and the plane mirror 12' may alternatively be composed of either a lens system or a concave mirror and a plane mirror and is primarily intended to shape most of the pencil of light emitted from the light source 11 into a parallel or substantially parallel rays of light.

Although in the illustrated Rochon's prism 13 the vertical angle common to the calcite prisms 14 and 16 is 45°, this angle need not necessarily be 45° provided that the angle of incidence of the incident light 11' is adjusted according to the vertical angle of the calcite prisms. Also, it is not mandatory to dispose the first and the second refracting surfaces 17 and 18 parallel to the principal surfaces of the Z-cut member 19. Furthermore, the orientation of the prism may be reversed. The birefringence element may alternatively be a Senarmont's prism, a Wollaston's prism, an Abbe's polarization prism, a Nicol's prism modified in the manner to be later mentioned, or a single calcite plate. As for the Senarmont's prism which may be employed in the manner heretofore explained in conjunction with the Rochon's prism, it should be noted that the electric intensity of the first linearly polarized light lies perpendicularly to that resulting from the Rochon's prism.

Referring to FIG. 2 which illustrates a Wollaston's prism having a first calcite prism 14' which is the same as that of the Rochon's prism and a second calcite prism 16' which has its optical axis laid perpendicular to both the optical axis of the first calcite prism 14' and to the edge of the prism so that the ordinary ray in one of the calcite prisms will become the extraordinary ray in the other and the extraordinary ray in the one may become the ordinary ray in the other. This arrangement causes the linearly polarized component of the incident light 11' (which incident light is shown by arrow 54') which is the extraordinary ray in the first calcite prism 14' to assume the same path as in the Rochon's prism of FIG. 1 and the reflected second linearly polarized light (which has been modulated in the Z-cut member) is refracted at the junction surface 15'. That component of the incident light 11' which is the ordinary ray in the first calcite prism 14' is also refracted at the junction surface 15. As for the Nicol's prism, it is necessary (in order to allow utilization of the usually unnecessary ordinary ray in the prism) to optically polish at least one of those opposing edges of the rhombic cylinder (which gives the direction of electric intensity of the output light taken out in the usual manner of usage) to form a plane which is preferably parallel to the plane of polarization of the usual output light. The Abbe's polarization prism may be used just like a Rochon's prism. With the single calcite plate which is defined by the surfaces of cleavage, the incident and the output light 11' and 22', although disposed parallel, may also be separated from each other if the point of incidence of the incident light 11' to the modulating system (comprising the birefringence element and the crystal member) is made to differ from the point of exit therefrom of the output light 22', even though either the ordinary or the extraordinary rays in the calcite plate may be used as the incident light to the crystal member.

Crystal having large electro-optical effects for use in this invention may include any of the crystals of the KDP family which belongs to the tetragonal system and in particular may include potassium dihydrogen phosphate, potassium dideuterium phosphate, potassium dihydrogen arsenate, and potassium dideuterium arsenate. The crystal may also be a member of the ADP family which belongs also to the tetragonal system and includes ammonium dihydrogen phosphate, ammonium dideuterium phosphate, ammonium dihydrogen arsenate, and ammonium dideuterium arsenate. Furthermore, the crystal may also include some crystals of the cubic system, such as zinc sulfide and copper (1) chloride. The crystal of the cubic system may be considered a special case of the tetragonal system from the view point of crystal optics. It is possible to use such a cubic crystal not only in the manner already explained in conjunction with the KDP crystal but also in another way to be described.

Referring to FIG. 3, a crystal member 19' of the cubic system is shaped into a cube which is defined by either crystal faces having Miller's notation (100), (011), and (011) respectively, or planes corresponding to such crystal faces and by either the crystal faces or planes which are parallel to the first-mentioned crystal faces or planes. A point P shows the face center of the plane (011) or the rectangle ACBD and is a point of intersection of the following axes: X-axis which is parallel to the edge AD, Y'-axis which is parallel to the edge AC, Z'-axis which is perpendicular to the plane ACBD, and Y and Z-axis which are the bisectors of the respective angles formed by the Y' and the Z'-axes and lie on the Y'PZ' plane. Incidentally, the diagonal lines AB and DC are the bisectors of the angles formed by the X and the Y'-axes which are on the ACBD plane. If the crystal member is so oriented that its three crystallographic axes are parallel to the X, Y, and Z-axes and if the modulating voltage is applied in the direction of the X-axis, then the induced optical axes will appear in the directions of the Y' and the Z'-axes in the manner explained with Equation 1. If a linearly polarized light (whose electric intensity lies along the direction of the diagonal line AB or the bisector of the angle formed by the X and the Y'-axes shown in FIG. 3 by a number of vertical lines 25), is now projected into the crystal member along the Z'-axis, then the light undergoes modulation because the refractive index for its Y' component varies in the manner given by the second equation of Equations 1. It is, however, to be noted that inasmuch as no variation is introduced in this case into the refractive index for the X component, the modulation degree is only half as large as that attainable when the crystal member is so oriented that the light path and the direction of the applied voltage coincide with each other as in the examples heretofore explained. The merit of the device of FIG. 3 resides in the fact that the electrodes for the modulating voltage are disposed aside the light path and consequently that they are easily manufactured. The reflecting surface must, however, be small enough so as not to adversely affect the modulating electric field or be a dielectric multilayer reflecting film or be disposed in spaced relation from the crystal faces. Incidentally, the reflecting surface is by no means restricted in the former examples as to the dimensions and the distance from the crystal faces.

The electrode for the modulating voltage may be (in case they are not in the light path) a thin metal film which may be an evaporated or a chemically deposited silver film which can serve also as the reflecting surface. If the electrode is in the light path either a transparent electrode such as formed of a NESA coating or a mesh electrode (which may be a thin mesh-like metal film) may be formed, for example, by evaporation of silver; or an annular electrode may be used which comprises a conductor ring disposed around the surface to be supplied with the voltage and which may be considered to be an extreme case of the mesh electrode.

The reflecting surface may be an evaporated or a chemically deposited silver film, or the like, or a multilayer dielectric film.

The means for causing the one-eighth-wavelength phase difference for providing a linear light modulator, may comprise a mica plate or a modified Fresnel's rhombic prism.

Referring to FIG. 4, in which there is illustrated a rhombus EGHI, shows a cross-section of a Fresnel's rhombic prism taken on a plane which is perpendicular to an edge of the prism. The Fresnel's rhombic prism is made of crown glass and has a vertical angle E of 54°. Linearly polarized light shown by arrow 60 to be projected perpendicularly into the EI surface (which light has, for example an electric intensity forming an angle of 45° with respect to the illustrated cross-section) undergoes, upon being reflected at either the EG or the HI surfaces, a phase shift of approximately one-eighth wavelength and becomes a circularly polarized light when it comes out perpendicularly to the GH surface as shown by arrow 61, A triangular prism may be obtained by cutting a Fresnel's rhombic prism of FIG. 4 through a plane IF (which forms an angle of 72° with the EI surface) which is provided with a cross-section EFI. This triangular prism causes the incident linearly polarized light to come out perpendicularly of the IF surface as indicated by arrow 62, after having been phase-shifted at the EF surface by approximately one-eighth wavelength. It follows therefore that when the crystal member and the reflecting surface are disposed along a line which is perpendicular to the IF surface or in a direction forming an angle of 72° with the incident linearly polarized light within the plane of incidence, the reflected elliptically polarized light returning from the reflecting surface is projected perpendicularly onto the FI surface, and is caused to come out of the EI surface along a path reversed with respect to the incident linearly polarized light as illustrated by arrow 63. The triangular prism thus serves equally as well as the mica-one-eighth wavelength plate. The modified Fresnel's rhombic prism has a wider field of application than the mica plate in that the phase difference attained by the former is substantially independent of the wavelength of the light and the latter is only effective for a particular wavelength. The fact that the light path turns aside by approximately 72° might be a disadvantage for some applications but in fact is advantageous in some other arrangements. The material for the triangular prism may be any isotropic transparent one having an equal or larger refractive index than crown glass, provided that the angles formed by the surfaces of the prism are adjusted according to the refractive index of the material used.

Also, it is to be understood that the generally elliptically polarized light not only includes the elliptically polarized light but also linearly polarized light.

What is claimed is:

1. An optical modulator comprising:
   a light source for generating a light beam;
   a crystal piece of large electro-optical effect having two surfaces substantially perpendicular to an optical axis of said crystal piece;
   means disposed in parallel with said surfaces for reflecting a light beam passing through said crystal piece along said optical axis, back to the same light path;
   means for applying a modulating signal across said crystal piece to rotate the plane of polarization of said light beam; and
   a birefringence prism disposed between said light source and crystal piece for splitting said source light beam into ordinary-ray and extraordinary-ray beams and directing one of said split beams to said crystal piece, and directing the modulated reflected component of the light beam along the optical path other than that of said source light beam.

2. An optical modulator as claimed in claim 1, wherein said reflector means consists of a reflective film formed on the one of said surfaces of said crystal piece remote from the incident light beam surface.

3. An optical modulator as claimed in claim 1, wherein said crystal piece is provided with a substantially transparent electrode formed on the other of said surfaces of said crystal piece, said modulating signal being applied across said transparent electrode and said reflective film.

4. An optical modulator as claimed in claim 1 further comprising an optical phase shift means disposed in the light path between said crystal piece and said birefringence prism for giving a predetermined amount of phase shift to the light beam passing therethrough.

5. A light modulator as set forth in claim 1 wherein the crystal has a structure having three orthogonal crystallographic axes, at least two of which have axial ratios equal to each other, the surfaces of said crystal in said two axes defining planes which are perpendicular to the surfaces of said crystal in the remaining third axis, and wherein the modulating signal is supplied to the crystal in the direction of said third axis and the light is also transmitted and reflected through said crystal in the direction of said third axis.

References Cited

UNITED STATES PATENTS

| | | |
|---|---|---|
| 2,467,325 | 4/1949 | Mason. |
| 2,788,710 | 4/1957 | West. |
| 3,243,724 | 3/1966 | Vuylsteke. |
| 3,284,632 | 11/1966 | Niblack et al. |
| 3,329,474 | 7/1967 | Harris et al. |
| 3,356,438 | 12/1967 | Macek et al. _____ 350—150 |

DAVID SCHONBERG, *Primary Examiner.*

PAUL R. MILLER, *Assistant Examiner.*

U.S. Cl. X.R.

350—157, 160